No. 790,751. PATENTED MAY 23, 1905.
R. H. RICHARDS.
HARROW ATTACHMENT FOR PLOWS.
APPLICATION FILED MAR. 16, 1905.

Witnesses
Edwin L. Bradford.
J. Ferdinand Vogt.

Inventor
Richard H. Richards

By Mann & Co,
Attorneys

No. 790,751.　　　　　　　　　　　　　　　　　　　　　Patented May 23, 1905.

UNITED STATES PATENT OFFICE.

RICHARD H. RICHARDS, OF BALTIMORE, MARYLAND.

HARROW ATTACHMENT FOR PLOWS.

SPECIFICATION forming part of Letters Patent No. 790,751, dated May 23, 1905.

Application filed March 16, 1905. Serial No. 250,334.

*To all whom it may concern:*

Be it known that I, RICHARD H. RICHARDS, a citizen of the United States, residing at Baltimore, in the State of Maryland, have invented certain new and useful Improvements in Harrow Attachments for Plows, of which the following is a specification.

My invention relates to improvements in harrow attachments for plows.

The object of the invention is to provide an improved construction of harrow that may be readily attached to a plow, so that the furrow previously turned may be thoroughly pulverized simultaneously with the turning of a new furrow.

Another object of the invention is to provide a construction whereby the harrow may have a vertical movement at the end which is attached to the plow and also be capable of being swung up vertically at the side of the plow in order to pass around stumps or other obstructions. By means of my construction the harrow is also capable of operating at either side of the plow to suit the convenience of the operator.

The invention is illustrated in the accompanying drawings, in which—

Figure 1:
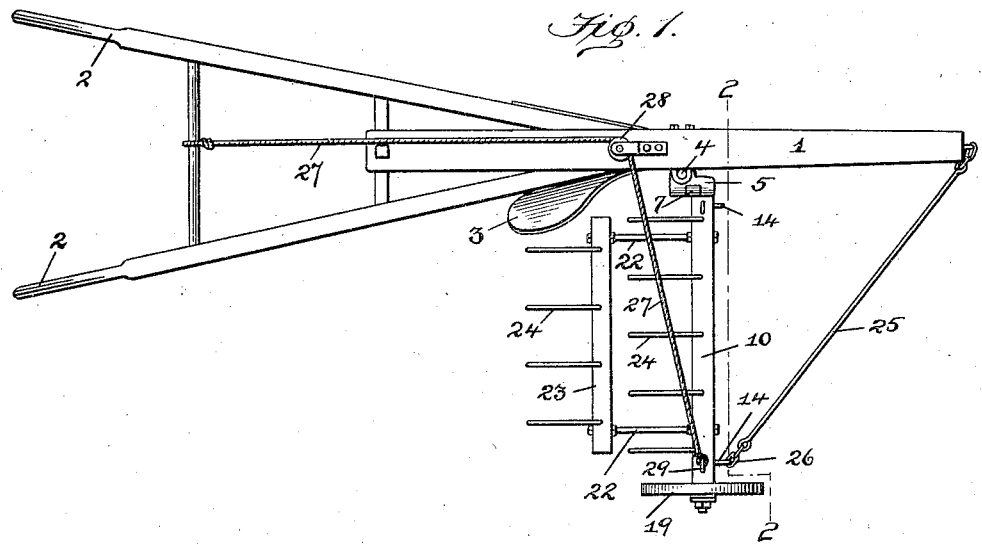
Figure 2:
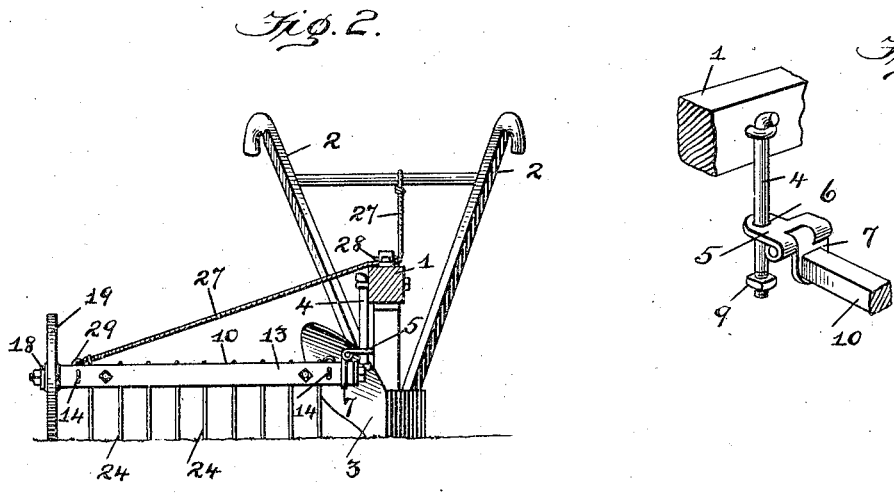
Figure 3:
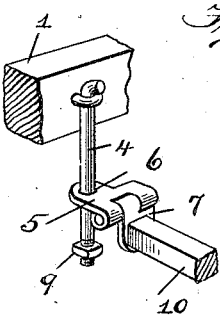
Figure 4:
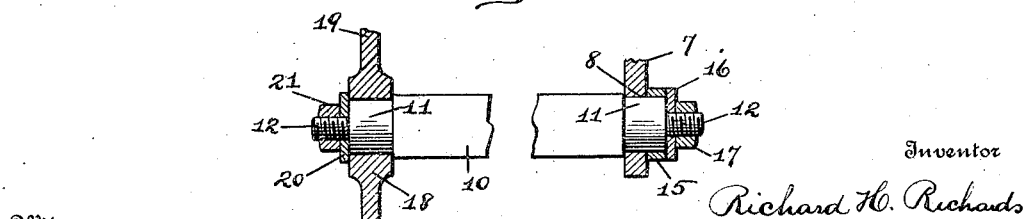

Figure 1 illustrates a top plan view of a plow provided with my improved harrow attachment. Fig. 2 is a front sectional elevation taken on the line 2 2 of Fig. 1. Fig. 3 is a perspective detail of a portion of the plow-beam and the depending harrow-supporting rod; and Fig. 4 illustrates a sectional detail, on an enlarged scale, of the ends of the harrow-beam to show that both ends are alike and that the beam is reversible.

Referring to the drawings by numerals, 1 designates the plow-beam; 2, the plow-handles, and 3 the moldboard. These features may be of any of the well-known constructions, as by themselves they form no part of the improvement except in combination with the devices now to be described.

A rod 4 has one end attached in any suitable manner to the plow-beam 1, and the other end of said rod depends or projects below said beam. On its lower projecting end this rod carries a horizontal plate 5, which is provided with a perforation 6, through which the rod passes freely, so that the plate may have a free vertical movement on said rod. A bracket-plate 7 is pivotally connected to the perforated plate 5, and said bracket-plate normally extends downwardly and at right angles to the plate 5. This bracket-plate is also provided with a perforation 8, as will be understood by referring to Fig. 4, so that the two plates if separated from the plow and harrow will have the appearance of a hinge both leaves of which are provided with a perforation. A nut 9 on the lower end of the rod 4 serves to hold the plate 5 on said rod.

The harrow-beam 10 in the present instance comprises a square bar which is provided at both of its ends with a shoulder 11, which is circular, and beyond said shoulder is further provided with a threaded reduced portion 12. Adjacent each of the shoulders 11 the harrow-beam is provided at its front vertical side 13 with a metal screw-eye or eyebolt 14. The inner shouldered end of the harrow-beam is inserted in the perforation 8 of the bracket-plate 7, and a sleeve 15 surrounds the shoulder beyond the plate 7, while a washer 16 and nut 17 hold the end of the harrow-beam in the perforation of said bracket-plate. At the other or outer end the circular shoulder 11 of the harrow-beam receives the hub 18 of a supporting-wheel 19, while a washer 20 and nut 21 serve to hold the wheel on the said outer end.

A plurality of horizontal rods 22 project laterally from the rear side of the plow-beam, and said rods sustain a supplemental or additional harrow-beam 23 at the rear of the beam 10. A plurality of curved spring-teeth 24 are attached to the beams 10 and 23, and said teeth curve downwardly toward the ground.

A brace-rod 25 extends from the plow-beam to the outer end of the harrow-beam 10, and said rod is attached by links 26 to the screw-eye or eyebolt 14 at the outer end of the harrow-beam, as seen in Fig. 1. This rod serves to keep the harrow-beam in a position at right angles with respect to the plow-beam when the plowing and harrowing operations take place.

A cord or rope 27 has one end attached to the plow adjacent the handles, and said cord or rope passes around a pulley 28 on the top surface of the plow-beam, and the other end of said cord is secured in an eye 29 at the outer end of the harrow-beam.

During the operation of plowing it will be seen that the harrow will drag at the side of the plow and pass over and pulverize the previously-turned furrows, and when an obstruction is reached over which the harrow cannot pass a pull on the cord or rope will cause the harrow to be elevated to a vertical position with respect to the plow-beam. It will also be seen that during the operation the harrow, being sustained at the outer end by a wheel, will have a vertical movement, and being loosely connected at its inner end to the rod 4 said inner end may also rise and fall and relieve the teeth of undue strain.

Having thus fully described my invention, what I claim as new, and desire to secure by Letters Patent, is—

1. The combination with a plow, of a rod attached to said plow; a perforated plate sliding loosely on said rod; a perforated bracket-plate pivoted to said sliding plate; a harrow-beam attached at one end to said bracket-plate and movable vertically with said sliding plate and a wheel at the outer end of said harrow-beam.

2. The combination with a plow, of a rod attached to the plow and projecting below the plow-beam; a perforated plate sliding loosely on said rod; a perforated bracket-plate pivoted to the sliding plate and extending downwardly at right angles thereto; a harrow-beam having a shoulder and a reduced threaded extension at each end and the shoulder at one end fitting in the perforation of the bracket-plate while the shoulder at the other or outer end receives the hub of a wheel, the inner end of said harrow-beam being movable vertically with respect to the rod on the plow; a rod connecting the outer wheel-sustained end of the harrow-beam with the plow-beam, and means for raising the outer wheel end of the harrow-beam to a vertical position at the side of the plow.

In testimony whereof I affix my signature in presence of two witnesses.

RICHARD H. RICHARDS.

Witnesses:
CHARLES B. MANN, Jr.,
FELIX R. SULLIVAN.